United States Patent [19]
Perron et al.

[11] 3,777,263
[45] Dec. 4, 1973

[54] PEAK HOLDING CIRCUIT
[75] Inventors: Robert R. Perron, Beverly; Harvey L. Pastan, Chestnut Hill, both of Mass.
[73] Assignee: The Eastern Company, Naugatuck, Conn.
[22] Filed: Feb. 17, 1972
[21] Appl. No.: 227,174

[52] U.S. Cl................ 324/103 P, 73/189, 324/163
[51] Int. Cl............................................ G01r 19/16
[58] Field of Search..................... 324/103 P, 103 R, 324/99 D, 161, 163, 158 MG; 73/189

[56] References Cited
UNITED STATES PATENTS
2,836,356   5/1958   Forrest et al. .................... 324/99 D
3,396,336   8/1968   Cropper......................... 324/103 R
3,502,980   3/1970   Baggott.......................... 324/103 R
3,525,040   8/1970   Rolfe............................. 324/103 R Primary Examiner—Rudolph V. Rolinec
Assistant Examiner—Ernest F. Karlsen
Attorney—Eckhoff, Hoope, Slick, Mitchell & Anderson

[57] ABSTRACT

A peak holding circuit is provided wherein an analog voltage from a tachometer is converted to and stored as a digital value and the digital value is converted back to an analog voltage and compared continuously with the tachometer output and corrected when the digital value falls below that of said output. A practical application of the circuit is described wherein the peak value of an anemometer is stored for indefinite lengths of time.

1 Claim, 2 Drawing Figures

PEAK HOLDING CIRCUIT

SUMMARY OF THE INVENTION

It is frequently desirable to store a peak value of an electrical circuit for an indefinite length of time. For instance, one might wish to store the peak reading of an electrical tachometer such as in an anemometer or a speedometer. In the past, attempts have been made to store such peak values in a high quality capacitor but this is not fully successful. For one thing, such capacitors and their associated circuitry are very expensive and, even under the best of circumstances, there is some leakage from the capacitor, particularly under humid conditions. Such circuits are incapable of maintaining a voltage with an accuracy of plus or minus 1 percent over periods much greater than several hours and there is ordinarily some loss when the circuit is interrogated.

In accordance with the present invention, a peak voltage storage device is provided wherein the information is stored in digital rather than in analog form. The circuit of the present invention can be made from inexpensive components and, as long as voltage is applied to the circuit, the data can be stored indefinitely.

There are many applications of a device such as that described. Although the circuitry was designed primarily for use with an anemometer to store and display the maximum speed of wind, the device can be used in any situation where one wishes to store a maximum voltage derived from an electrical tachometer. For instance, the device might be enclosed in a locked box so that one could determine the maximum speed of which a truck or other vehicles had been driven over a period of time. It might also be employed in an aircraft to record maximum speed and the like.

BRIEF DESCRIPTION OF THE DRAWINGS

In the drawings forming part of this application.

DESCRIPTION OF THE PREFERRED EMBODIMENTS

Figure 1:
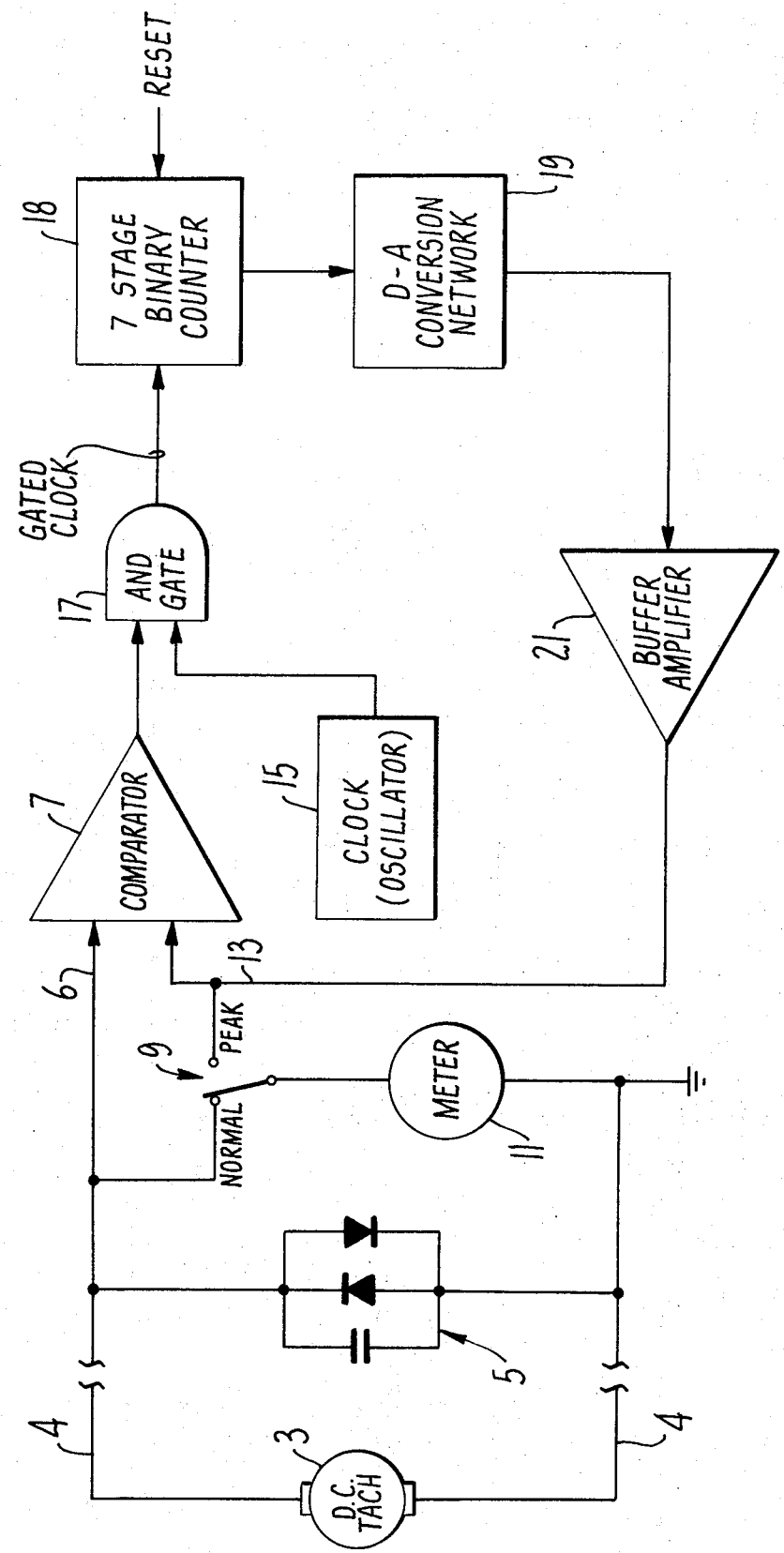
FIG. 1 is a block diagram of a peak holding circuit illustrating the theory of operation.

Referring now to the block diagram of FIG. 1, a tachometer 3 is provided which has a DC voltage output. Since this might be mounted on a high mast, long lines 4 may be necessary which are exposed to electrical disturbances so that protective diodes and capacitor 5 would normally be employed. The output of the tachometer 3 is fed to one input 6 of differential amplifier 7 and may also be fed through a double throw switch 9 to a meter 11 for reading the value. Meter 11 would normally be calibrated to read some desired information such as miles per hour. In the differential amplifier 7 the voltage from the input 6 is compared with a feedback input 13, the derivation of which will be described later. A clock 15 provides pulses to one input of an AND gate 17 and if the feedback voltage through line 13 is less than that from line 6, the clock pulses are passed into and stored in a binary counter 18. Thus, the voltage from line 6 is converted into digital form in counter 18 and is stored in this form. The output from counter 18 is converted from digital to analog form in network 19, passed through a buffer amplifier 21 and fed back through line 13. The feedback signal has the same scale factor and polarity as the tachometer and therefore can be read off of the same meter 11. If the voltage output of 3 increases, gate 17 is opened, the pulses counted in 18 and fed back through line 13 to comparator 7. When these voltages are equal, AND gate 17 will be cut off so that the clock pulses will no longer be passed into the counter 18. One can read the peak value by turning switch 9 to the peak position.

Figure 2:
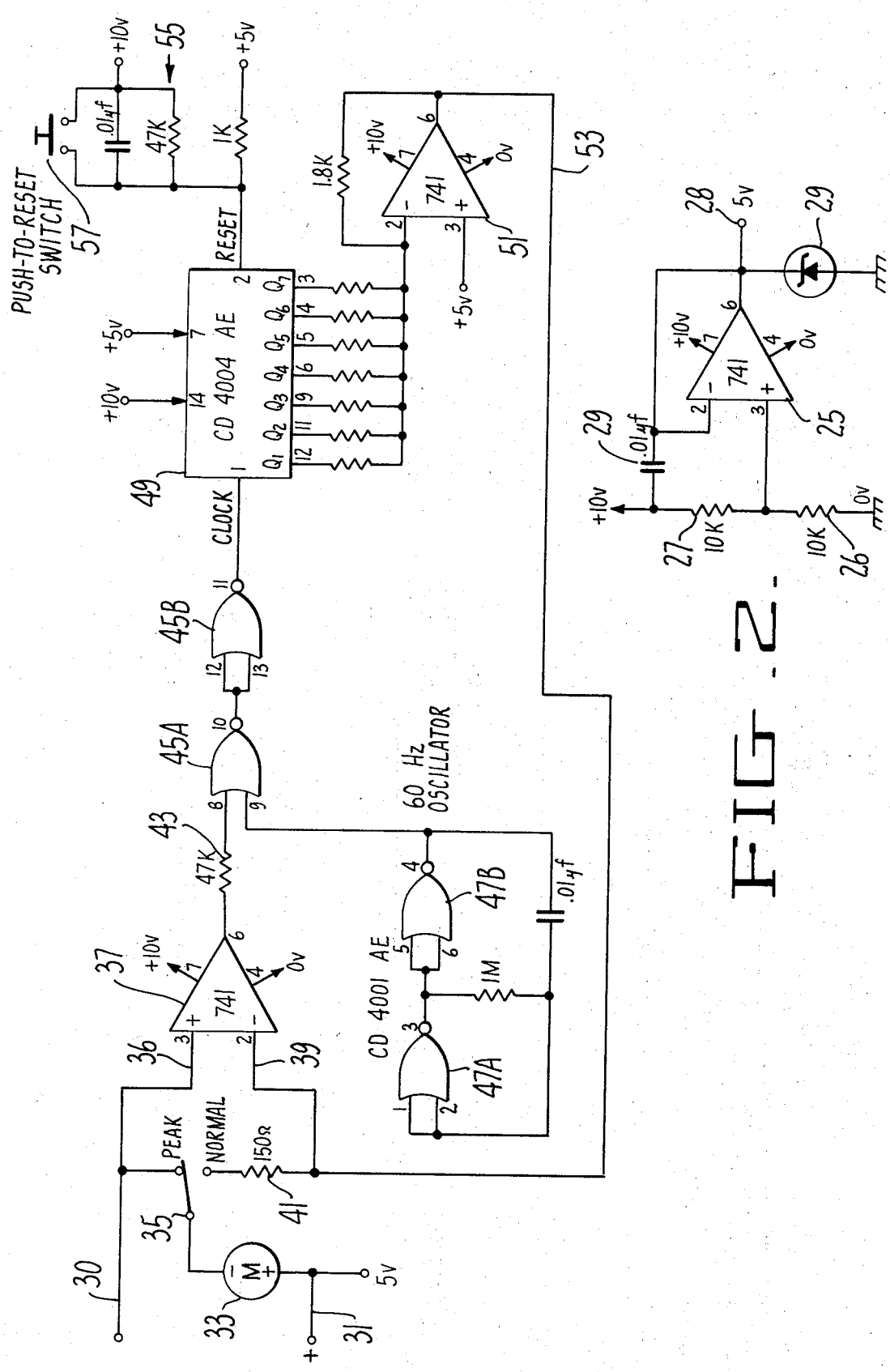
FIG. 2 is a schematic diagram of a practical circuit embodying the present invention.

In FIG. 2, a practical embodiment of the invention is shown. Here power is supplied to the circuit by means of an operational amplifier 25 which is arranged as a voltage follower. The input is a voltage divider made up of the resistors 26 and 27 to give a 5 volt output at point 28. The 5 volt output is considered signal ground or logic state zero. Since the anemometer will be mounted in an elevated exposed location such as a rooftop or at the top of a mast, it will see high static electrical potentials during thunder storms. In a marine installation, one terminal of the battery is grounded at zero volts. The leads of the tachometer are at a high impedance above ground. High static potentials could permanently damage some of the active circuitry. Zener diode 29 from the +5V point to OV may be used to protect the circuit from damage. Capacitor 29 suppresses high frequency logic switching transients which might otherwise disturb the power supply.

The input from the tachometer to the circuit is through leads 30 and 31 and in this instance a maximum voltage of 0.3 volts represents a wind speed of 100 miles per hour. Meter 33 is a 200 $\mu$a microameter calibrated to read wind speed. Switch 35 provides for reading the normal speed or the peak wind speed. The voltage is fed to the non-inverting input 36 of operational amplifier 37. The comparison feedback voltage is fed through line 39 to the inverting input of amplifier 37. A 150 ohm resistor 41 is employed in the meter circuit to linearize the reading because there is some ripple in the circuit and otherwise the meter would read the peak of the ripple rather than the desired rms value. Output from amplifier 37 is passed through a 47 K resistor 43, the resistor being necessary since the amplifier output is capable of swinging below logic zero potential. This output is fed to the two cascaded NOR gates 45A and 45B. Two more NOR gates 47A and 47B function as a clock oscillator and in the embodiment shown, the feedback loop provided by the resistor and capacitor shown, give a frequency of 60 Hz having a square wave output at an amplitude of from 5 volts (logic zero) to 10 volts (logic one). Now, if the magnitude of the voltage at input 36 is greater than that of input 39, the output at resistor 43 will go negative to the logic zero state, permitting the clock pulses from the oscillator 47 to pass through the NOR gates into counter 49. Counter 49 is a C MOS (complementary symmetry metal-oxide-semiconductor) seven stage binary counter having outputs designated Q1 through Q7 which are converted into precision currents scaled in a binary fashion, i.e., 1, 1/2, 1/4, 1/8, 1/16, 1/32, 1/64 and 1/128. The C MOS binary output gates have the unique property of being a pure resistive source impedance from output to signal ground on the logic zero state and supply voltage or plus 10 volts in logic one state. This source resistance is of the order of 800 to 1,000 ohms. No voltage drops are involved in the output equivalent circuit. Thus, each gate in the counter can act as an analog switch in series with the binary scaled resistors in the digital to analog network. In the embodiment described, the counter was a CD 4004 AE and the resistors had the following values:

| Counter Output | Ideal | Actual |
|---|---|---|
| Q1 | 3,200K ±32% | 3.3M ±10% |
| Q2 | 1,600K ±16% | 1.6M ±5% |
| Q3 | 800K ±8% | 820K ±5% |
| Q4 | 400K ±4% | 390K ±2% |
| Q5 | 200K ±2% | 200K ±2% |
| *Q6 | 100K ±1% | 99K ±1% |
| *Q7 | 50K ±½% | 49K ±½% |

* Note that the 1 K source resistance has been subtracted from the "actual" resistor values.

The output from the summing resistors is fed to the inverting input of operational amplifier 51. A 1.8 K resistor in the feedback loop is provided and this converts the amplifier maximum current of 200 microamps to a voltage level of about 0.35 volts. The least significant bit resolution is about 0.92 percent of the full scale reading when the supply voltage is 10 volts. The output of amplifier 51 is now fed through line 53 back to line 39 to the inverting input of amplifier 37. The feedback signal has the same scale factor and polarity as the tachometer output and therefore can be read off the same indicator meter by means of the selector switch 35. If the wind speed increases above the peak storage speed, the output polarity of the comparator 37 changes logic state, allowing the AND gate to pass the clock signal pulses into the counter. As the count increases, the voltage in lines 39 and 36 equalizes, causing amplifier 37 to go to logic zero, cutting off the clock pulses. As long as the power is applied to circuit, the counter binary outputs remain unchanged and therefore the analog equivalent to the binary output from the buffer amplifier remains at the peak measured wind speed.

A reset network generally designated 55 is provided which causes the counter to be cleared to logic zero when power is turned on. The 0.1 capacitor from plus 10 volts to reset initially acts as a short circuit applying the 10 volts to the reset terminal. The 47 K resistor merely discharges the capacitor when power is turned off. A push to reset switch 57 is also provided for manually resetting the counter to zero at anytime. Of course, if only manual reset is desired, it is not necessary to employ the network shown and it is sufficient to provide a single pole, double throw switch which connects the reset terminal plus 5 volts in a normal mode and momentarily to 10 volts to clear the counter.

Many variations can be made in the circuitry shown without departing from the spirit of this invention. For instance, a seven digit register has been shown but it is obvious that more stages could be employed for greater accuracy or that fewer stages could be employed if less accuracy could be tolerated. The seven stage counter was selected because it is readily available commercially and gives an accuracy at least as good as the usual meter.

Similarly, a simple AND gate using TTL logic could be used but the cascaded NOR gates of the C MOS type give a lower power drain. The clock frequency determines the maximum rate at which the circuit can follow a rate of increase in voltage. The values selected provide a slew rate at the feedback point of about 1 mph per 16 milliseconds or 60 mph increase in one second. Since an anemometer cannot accelerate faster than this, there is no need to use a higher clock frequency in this case.

We claim:
1. A device for indicating selectively the instantaneous value of a tachometer output and a peak value of said tachometer output comprising in combination:
   a. a tachometer providing a source of variable voltage, said voltage being proportional to the speed at which the tachometer is driven,
   b. a differential amplifier having one input connected to the output of said tachometer,
   c. an AND gate having one input connected to the output of said differential amplifier and a second input connected to a clock circuit providing a series of pulses,
   d. a binary counter and storage device connected to the output of said AND gate,
   e. a digital to analog conversion network connected to said binary counter whereby the binary count is converted to an analog signal,
   f. means for applying said analog signal to the second input of said differential amplifier as a feedback voltage whereby said differential amplifier will cause said AND gate to open whenever a voltage difference exists between the inputs to said differential amplifier,
   g. a meter in said circuit having switching means connected thereto whereby said meter can be connected directly to said tachometer output to indicate the instantaneous value of said tachometer output and switched to a second position into the feedback circuit whereby said meter will read the stored feedback voltage in said circuit to indicate the peak value of tachometer output.

* * * * *